United States Patent Office 3,116,326
Patented Dec. 31, 1963

3,116,326
DODECYLGUANIDINE SALTS OF BORIC ACID
Glentworth Lamb, Stamford, Conn., assignor to American Cyanamid Company, New York, N.Y., a corporation of Maine
No Drawing. Original application Nov. 13, 1957, Ser. No. 696,068, now Patent No. 2,921,881, dated January 19, 1960. Divided and this application Oct. 9, 1959, Ser. No. 845,328
2 Claims. (Cl. 260—564)

This invention is concerned with the control of diverse pathogens on living plants. More particularly, it relates to a new group of dodecylguanidine salts which are highly effective in protective and/or eradicative control of fungi pathogenic to plants, to methods for their preparation and to fungicidal formulations containing these compounds. More specifically, salts of dodecylguanidine and certain polybasic acids are contemplated.

This application is a division of my co-pending application for United States Letters Patent, Serial No. 696,068, filed November 13, 1957, now U.S. Patent No. 2,921,881, issued January 19, 1960, which, in turn, is a continuation-in-part of U.S. application Serial No. 593,837, now U.S. Patent No. 2,867,562, issued January 6, 1959. In the patent it is shown that monocarboxylic acid salts of dodecylguanidine are effective fungitoxicants, particularly for the protection of fruit trees. At similar concentrations these salts exhibit similar inherent fungitoxicity and the acetate may be taken as a typical illustration. Despite their remarkable fungicidal activity, attempts at wider usage of these salts encounter certain limitations. At concentrations adequate for control of many plant pathogens their use may result in severe host toxicity or even death.

Fungitoxicants which are not so limited in use are highly desirable. It is, therefore, the principal object of the present invention to supply such a demand. Quite unexpectedly, in view of the similarity of properties of the salts noted above, this has been accomplished in the discovery and use of the novel dodecylguanidine salts of this invention.

In general, the novel salts of the present invention may be characterized by the formula

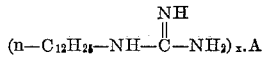

wherein $x$ may be one or two and A is the residue of a polybasic acid, organic or inorganic in nature. The polybasic acid salts contemplated by the present invention are the borate, malate and the acid phthalate.

Most previously-known fungitoxicants are unsatisfactory due to an inadequacy in respect to one, or more often a combination, of such factors as their ability to safely protect diverse plants against diverse pathogens, their long-term adherent and residual properties, and their ability to destroy pathogens for an extended interval after invasion and colonization have occurred.

In these respects, the present invention provides fungitoxic and bacteriotoxic agents which are superior to those previously proposed. They are characterized by the unexpected advantage of unique safety to a wide variety of plants. In addition, these novel salts are unexpectedly superior to the monocarboxylic acid salts such as dodecylguanidine acetate and the like in eliminating, eradicating, or decreasing certain plant diseases.

Preparation of the compounds of the present invention will be illustrated in conjunction with the following examples which are intended for that purpose only and not by way of limitation.

EXAMPLE 1

Preparation of Dodecylguanidine Borate

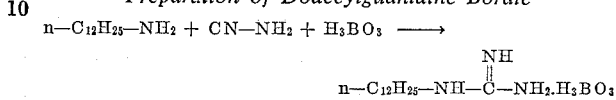

A mixture of 132 parts of dodecylamine and 350 parts of water is heated under reflux to about 75° C. To this is added 63 parts of boric acid all at once with good stirring. While the temperature is held below 80° C., stirring is continued until the thick emulsion thins out to a milky consistency. The mixture is now heated gradually to 84–85° C. and addition of a solution of about 36 parts of cyanamide in about 107 parts of water is begun with continued stirring. The first 59 parts of this mixture is added over about 10 minutes, with reaction temperature maintained at 84–86° C. The remainder is added over about 45 minutes, with the reaction temperature at 90–95° C., but not allowed to exceed 95° C. The temperature is held at 93–95° C. for 1½ hours longer, with stirring, and heating is then stopped. When cool, the mixture is filtered and the precipitate washed with water by reslurrying if necessary. The technical product is then reslurried in a ketone (methyl ethyl ketone is preferred), refiltering, and air-dried with very gentle or no heating. Yield, about 170 parts; M.P. above 300°.

EXAMPLE 2

Preparation of Dodecylguanidine Borate

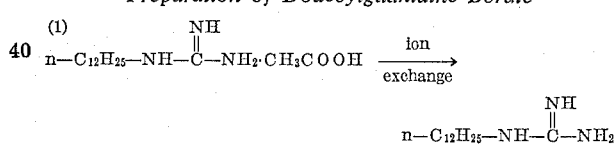

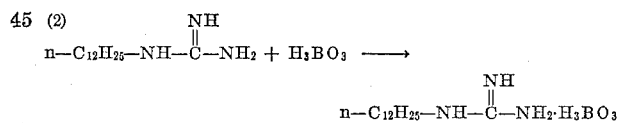

To illustrate an alternative method, a solution of 5 parts of dodecylguanidine acetate in 40 parts of 50% aqueous isopropanol is passed through a column of an anion-exchange resin (Amberlite IRA–400, Rohm and Haas Co.) in the hydroxy form, the column being of a size sufficient to convert all of the salt to the free base. This solution is mixed with a solution of 1.08 parts of boric acid in 25 parts of absolute ethanol. The mixture is concentrated under vacuum to about ½ of its total volume, and 100 parts of water is added. After thorough chilling, the mixture is filtered, and the precipitate is washed with acetone and dried. Yield, about 1 part; M.P. above 300° C., with yellowing at about 225° C. This product is analytically pure.

EXAMPLE 3

*Preparation of Dodecylguanidine Acid Phthalate*

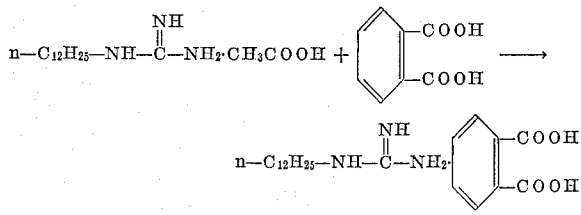

A solution of 14 parts of dodecylguanidine acetate in 50 parts of hot water is added rapidly with stirring to a solution of 8 parts of phthalic acid in 80 parts of hot water; (the phthalic acid solution can be prepared from the equivalent amount of phthalic anhydride, which hydrolyzes to the acid in hot water). The mixture is cooled, and the crystalline precipitate is filtered, washed with water, and dried. Yield, about 19 parts (95–98% of theory); M.P. 93–94° C.

EXAMPLE 4

*Preparation of Dodecylguanidine Acid Phthalate*

The procedure of Example 2 is repeated, substituting an equivalent amount of phthalic acid for the boric acid. The product is identical with that of Example 3.

EXAMPLE 5

*Preparation of Bis(n-Dodecylguanidine) Malate*

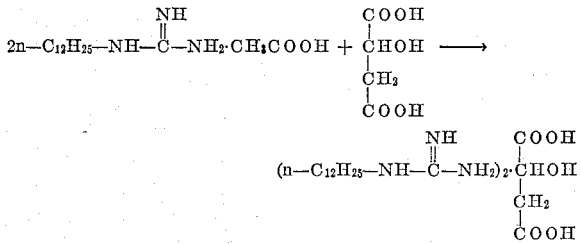

A solution of 7 parts of malic acid in 20 parts of water is added with stirring to a solution of 28.7 parts of dodecylguanidine acetate in 86 parts of hot water. The mixture is chilled; the product crystallizes slowly. The solid is filtered and dried. It can be recrystallized from about 3 times its weight of water. M.P. (pure) 86–88° C.

EXAMPLE 6

*Preparation of Bis(n-Dodecylguanidine)Malate*

The procedure of Example 2 is repeated, substituting two equivalents of malic acid for the boric acid. A product identical with that of Example 5 is obtained.

Phytopathogenic bacteria and fungi controlled by dodecylguanidine salts are representative of all major classes; hosts are varied and differ widely in their susceptibility to chemical injury. The use of any toxicant to control these and similar diseases is limited by phytotoxicity even within varieties of the same host species. The toxicants of this invention have utility for these problems whereas dodecylguanidine acetate and the like cannot be safely used on some hosts.

To illustrate the broad potential of this invention in agriculture, selected plant pathogens which dodecylguanidine salts control in the laboratory, glasshouse, or field are presented in Table I.

TABLE I

| Pathogen | Disease | Host |
|---|---|---|
| Basidiomcetes: *Gymnosporangium juniperi-virginianae* Schw. | Rust (cedar) | Apple. |
| Ascomycetes: | | |
| *Coccomyces hiemalis* Hig. | Leaf spot | Cherry. |
| *Elsinoe veneta* (Burk) Jenk. | Anthracnose | Brambles. |
| *Guignardia bidwellii* (Ellis), Viala et Ravaz. | Black rot | Grape. |
| *Monilinia fructicola* (Wint.) Rehm. | Brown rot | Cherry and Peach. |
| *M. laxa* (Aderh. and Ruhl.) Honey. | European brown rot. | Cherry. |
| *Podosphaera leucotricha* (E. & E.) Salm. | Powdery mildew. | Apple. |
| *Taphrina deformans* (Berk.) Tol. | Leaf curl | Peach. |
| *Venturia inaequalis* (Cke.) Wint. | Scab | Apple. |
| Phycomycetes: | | |
| *Phytophthora infestans* (Mont.) Du Bary. | Late Blight | Tomato, Potato. |
| *Rhizopus nigricans* Erh. | Fruit rots | Peach, Brambles, etc. |
| Deuteromycetes: | | |
| *Alternaria solani* (Ell. & Mart.) Jones & Grout. | Early blight | Tomato, Potato. |
| *Cladosporium carpophylum* Thum. | Scab | Peach. |
| *Collectotrichum lagenarium* (Pass.) Ell. et Halst. | Anthracnose | Cucurbits. |
| *Gloeodes pomigena* (Schw.) Colby. | Sooty fungus | Apple, Pear. |
| *Leptothyrium pomi* (Mont. & Fr.) Sacc. | Fly speck | Apple, Pear. |
| Schizomycetes (Bacteria): | | |
| *Bacterium stewarti* (E.F.S.) Stev. | Stewart's wilt. | Corn. |
| *Erwinia amylovora* (Burrill) Bergey et al. | Fireblight | Roseceae. |
| *E. atroseptica* (van Hall) Jennison. | Blackleg | Potato. |
| *Pseudomonas caryophylli* Burk. | Wilt | Carnation. |
| *Ps. phaseolicola* (Burk) Dows. | Halo blight | Bean. |
| *Xanthomonas phaseoli* (E.F.S.) Dow. | Common Blight. | Bean. |
| *X. pruni* (E.F.S.) Dow. | Bacterial spot | Stone fruits. |
| *X. vesicatoria* (Doidge) Dow. | Bacterial spot | Tomato. |

By way of further specific illustration, the effectiveness of the salts of the present invention is obvious from the following examples.

EXAMPLE 7

The toxicants of this invention were evaluated for fungitoxicity by a standard spore germination technique. Toxicants were suspended and/or dissolved in distilled water at graded concentrations. Conidia of *Monilinia fructicola* (Wint.) Rehm and *Stemphylium sarcinaeforme* (Cav.) Wiltshire were then suspended in the various concentrations of toxicants. After 24 hours at 82° F., the percent conidia killed was recorded. Typical results are presented in Table II.

TABLE II

| Dodecylguanidine Salt Applied | Percent Conidia Killed | | | | | | | | | |
|---|---|---|---|---|---|---|---|---|---|---|
| | *Monilinia fructicola* Concentration (p.p.m.) | | | | | *Stemphylium sarcinaeforme* Concentration (p.p.m.) | | | | |
| | 10.0 | 5.0 | 2.5 | 1.25 | 0.625 | 10.0 | 5.0 | 2.5 | 1.25 | 0.625 |
| Acetate | 100 | 100 | 100 | 50 | 0 | 100 | 50 | 0 | 0 | 0 |
| Borate | 100 | 100 | 50 | 10 | 0 | 100 | 75 | 0 | 0 | 0 |
| Acid Phthalate | 100 | 100 | 50 | 0 | 0 | 100 | 95 | 0 | 0 | 0 |
| Normal Malate | 100 | 100 | 50 | 10 | 0 | 100 | 95 | 10 | 0 | 0 |

As illustrated in Table II, the inherent fungitoxicities of the dodecylguanidine salts tested are generally similar to and equally or more effective than most commercially available agricultural fungicides. Therefore, if fungitoxicity were the only limiting factor, all dodecylguanidine salts would be expected to have similar utility and limitations for field application to plants. Quite surprisingly, according to the present invention, it has been found that this similarity does not extend to all the limiting factors. That it does not apply to phytotoxicity is shown in the following example.

EXAMPLE 8

Toxicants of this invention as compared with the acetate were assayed on cucumbers, variety Green Prolific, for control of anthracnose (incited by *Colletotrichum lagenarium* (Pass.) Ell. at Halst.) and for relative phytotoxicity. Cucumbers were sprayed with graded concentrations of aqueous solutions of the toxicants. After the spray deposits had dried, the test plants were inoculated with a conidial suspension (21,000/ml. $H_2O$) of the pathogen and immediately placed in a humidity cabinet held at 100% R.H. at room temperature; test plants were removed to the glasshouse after 24 hours. Disease and phytotoxicity were rated after 5 days in the glasshouse. Illustrative results are shown in Table III.

TABLE III

| Dodecylguanidine Salt Applied | Concentration (p.p.m.)[1] | Disease (percent) | Phytotoxicity |
|---|---|---|---|
| Acetate | 1,000 | | plants dead. |
| | 250 | 9.4 | moderate. |
| | 100 | 28.6 | trace. |
| | 50 | 48.4 | none observed. |
| Borate | 1,000 | 0 | Do. |
| | 250 | 0 | Do. |
| | 100 | 7.3 | Do. |
| | 50 | 10.9 | Do. |
| Acid phthalate | 1,000 | 0 | Do. |
| | 250 | 0 | Do. |
| | 100 | 0.5 | Do. |
| | 50 | 14.6 | Do. |
| Normal Malate | 1,000 | 0 | slight |
| | 250 | 0 | none observed. |
| | 100 | 0 | Do. |
| | 50 | 5.7 | Do. |

[1] (p.p.m.) = parts per million.

Table III, above, illustrates the increased fungitoxicity and the significantly lesser degree of phytotoxicity to be derived from applications of the borate, acid phthalate, and normal malate salts of dodecylguanidine in control of fungal diseases on plants. At the 1000 p.p.m. rate, use of the different salts resulted in death of the host when the acetate was used, but in no observed injury when the borate or acid phthalate were used; normal malate resulted in only slight injury. In particular areas of plant disease control, monocarboxylic acid salts such as the acetate, are not usable; whereas the toxicants of this invention have utility.

EXAMPLE 9

The toxicants of this invention were assayed on tomatoes, variety Bonny Best, for control of late blight (incited by *Phytophthora infestans* (Mont.) Du Bary and for relative phytotoxicity. Tomatoes were sprayed with graded concentrations of aqueous solutions of the toxicants. After the spray deposits had dried, the test plants were inoculated with zoospores (8,000/ml. of $H_2O$) of the pathogen and immediately placed in a humidity cabinet, maintained at 100% R.H. at 60° F.; test plants were removed to the glasshouse after 24 hours. Disease and phytotoxicity were rated after 7 days in the glasshouse. Illustrative results are recorded in Table IV.

TABLE IV

| Dodecylguanidine Salt Applied | Concentration (p.p.m.)[1] | Disease (percent) | Phytotoxicity |
|---|---|---|---|
| Acetate | 200 | [1] 0.3 | severe. |
| | 100 | [1] 0.9 | Do. |
| Borate | 200 | 0.9 | slight. |
| | 100 | 1.8 | trace. |
| Acid phthalate | 200 | 0.3 | slight. |
| | 100 | 0.9 | none observed. |
| Normal malate | 250 | 0.3 | Do. |
| | 100 | 2.8 | Do. |

[1] Severe injury obscured disease, difficult to rate disease severity.

Severity of late blight in the above test was similar regardless of the dodecylguanidine salt applied. However, the severity of phytotoxicity to tomato using the acetate would exclude it from field utility at concentrations effective for disease control. Injury with the acid phthalate, normal malate, and possibly the borate was negligible enough to allow their use for field control of late blight.

EXAMPLE 10

Acetate, borate, and acid phthalate salts of n-dodecylguanidine and bis(n-dodecylguanidine) malate were evaluated for protective and eradicative control of apple scab (incited by *Venturia inaequalis* (Cke.)Wint.) in the glasshouse on uniform potted apple trees, var. Rome Beauty. Samples of each toxicant were formulated as 70% wettable powder compositions containing 70 parts of active material (dodecylguanidine salt), 23 parts of kaolin, 3 parts of a modified phthalic glycerol alkyd resin, 2 parts of methylcellulose and 2 parts of a silicone antifoaming agent. In each test, 1.5 pounds of the wettable powder composition was suspended in 100 gallons of water for application as a spray.

In the protective evaluation, the test compounds were precisely applied to trees on a turntable. After the spray deposits had dried for 24 hours, different sets of treated trees were again placed on the turntable and exposed to two, four, or six inches of artificial rain applied at the rate of two inches per hour with a single solid-cone nozzle. When dry, the trees were inoculated with a standardized conidial suspension of the pathogen and placed in a humidity cabinet during the infection period. After the infection period, trees were removed to the greenhouse for disease development (approx. 3 weeks). The number of scab lesions on each leaf was recorded. Typical experimental data are recorded in the following table, Table V, as the number of lesions on the heaviest diseased leaf and the average number of lesions on the three heaviest diseased leaves.

TABLE V

| Dodecylguanidine Salt Applied | 2″ Rain— No. of Lesions | | 4″ Rain— No. of Lesions | | 6″ Rain— No. of Lesions | |
|---|---|---|---|---|---|---|
| | H. Leaf | Av. 3 Leaves | H. Leaf | Av. 3 Leaves | H. Leaf | Av. 3 Leaves |
| None | 98± | 53 | | | | |
| | 57 | 32 | | | | |
| | 70 | 67 | | | | |
| | 64 | 45 | | | | |
| | 46 | 38 | | | | |
| Acetate | 6 | 2.7 | 1 | .3 | 8 | 5 |
| | 5 | 2.3 | 6 | 3.3 | 7 | 3.7 |
| Normal Malate | 1 | .3 | 2 | 2 | 8 | 6 |
| | 1 | .3 | 6 | 3 | 1 | .7 |
| Borate | 1 | .7 | 2 | 1 | 5 | 3.7 |
| | 3 | 1.7 | 3 | 1.3 | 1 | 0.3 |
| Acid Phthalate | 6 | 4 | 9 | 7.3 | 22 | 15.7 |
| | 3 | 1.7 | 10 | 5.3 | 23 | 13.7 |

EXAMPLE 11

Additional samples of the wettable powders of Example 10 were evaluated as eradicative (after-infection) controls of apple scab in the glasshouse in a manner similar to the protective test. Trees were inoculated with standard suspensions of *Venturia conidia*, allowed to stand for infection periods of 24 and 30 hours, allowed to dry, were then sprayed with the test powders in water. Following drying of the spray deposits, trees were placed in a humidity cabinet for a minimum of 10 hours to allow effective toxicant release. After this time, trees were removed to the greenhouse for symptom expression. Illustrative results are shown in Tables VI and VII.

TABLE VI

| Dodecylguanidine Salt Applied | Pounds (70%) Powder/100 gal. | No. of Scab Lesions | |
| --- | --- | --- | --- |
| | | Heaviest Diseased Leaf | Av. of 3 Heaviest Diseased Leaves |
| None | | (¹) | (¹) |
| Acetate | 1.5 | 43 | 32.3 |
| | | 24 | 16.3 |
| Acid Phthalate | 1.5 | 22 | 7.3 |
| | | 17 | 6 |

¹ Too Severe to Count.

TABLE VII

| Dodecylguanidine salt applied | Pounds (70%) powder/100 gal. | Scab severity | |
| --- | --- | --- | --- |
| | | 24 hrs. after infection | 30 hrs. after infection |
| None | | Severe | Severe. |
| Acetate | 0.75 | Trace | Moderate. |
| Acid Phthalate | 0.75 | 0 | 0 |
| Acid Phthalate | 1.5 | 0 | 0 |
| Borate | 1.5 | 0 | 0 |

It will be seen that eradication of apple scab by the acid phthalate is superior to the acetate at 0.75 lb. (70%)/100. At the 1.5 lb. (70%)/100 rate the acid phthalate and borate salts completely eradicated scab 30 hours after infection (see Table VII). CAPTAN, a commercially available fungicide, consistently is an ineffective eradicant twenty-four hours after infection in such glasshouse research.

EXAMPLE 12

Acetate, borate and acid phthalate salts of n-dodecylguanidine, formulated similarly, were compared with CAPTAN and wettable sulfur in field trials as controls of bacterial leaf of peach (incited by *Xanthomonas pruni* (E.F.S.) Dow), and for relative phytotoxicity to peach foliage and fruits. Ten applications of the toxicants were used on bearing trees of peach, var. New Day. Two replicates of four trees each were used for each toxicant. Parathion (15%), 1½–100, was used in 6 of the applications. The dates of spraying were April 4 (petal-fall stage), April 11, 19, 25, May 2, 13, 23, June 3, 17, and July 2. Rating of foliage injury (chlorosis, shot-holing) on June 4 was made on the scale—0=no injury; 5=severe injury. On June 26 and July 1 samples of 25 fruits per tree were taken at random and rated for severity of bacterial spot. From those ratings an index of 0–100 for each tree was computed. On June 28, ratings were made of bacterial spot severity (0=none, 5=all leaves badly spotted) and estimates of percent defoliation on each tree from bacterial spot or bacterial spot plus spray injury. No brown rot developed with any of the treatments. No difference in ripening data of fruits was apparent on trees sprayed with the different toxicants.

TABLE VIII

| Fungicidal spray treatments | Pounds per 100 gal. | Phytotoxicity June 4 | Bacterial spot | | |
| --- | --- | --- | --- | --- | --- |
| | | | Index on fruits (0-100) | Rating on leaves (0-5) | Estimated defoliation, percent |
| Wettable sulfur | 6 | 0 | 17 | 2.3 | 18 |
| "Captan" (50%) | 2 | 0 | 19 | 2.4 | 22 |
| Acetate salt (70%) | 1 | ᵃ3 | 11 | 3.0 | 30 |
| Do | 1.5 | ᵇ5 | 11 | 3.0 | 28 |
| Acid phthalate (70%) | 1.5 | ᶜ1 | 12 | 1.8 | 17 |
| Borate | 1.5 | ᵈ2.5 | 9 | 2.0 | 20 |

ᵃ Much chlorosis and shot-holing of leaves; fruits yellow.
ᵇ More chlorosis and shot-holing of leaves than (ᵃ); fruits yellow.
ᶜ Much less chlorosis and shot-holing of leaves than (ᵃ).
ᵈ Chlorosis and shot-holing of leaves about like (ᶜ) or slightly greater. Disagreeable odor to sprayed trees.

All dodecylguanidine salts were superior to standard toxicants in decreasing bacterial spot. However, n-dodecylguanidine acetate was too phytotoxic, to the peach trees, to be used commercially. The acid phthalate salt resulted in decrease disease with little phytotoxicity; actually, most foliar "shot-holing" probably resulted from eradication of the pathogen at invasion sites. The borate salt was as effective as, or more effective than, the acid phthalate in disease control, but was more phytotoxic. Since the salts of dodecylguanidine are extremely promising for the control of diverse plant pathogens, toxicity to hosts is the limiting factor in commercial applications. It is obvious from the above data that the acid phthalate and the borate are superior to the acetate for applications on plants sensitive to chemical injury.

From the above data and discussion, it is evident that the toxicant salts of this invention have both eradicative and tenacious residual protective properties which combine to result in one of the most effective organic toxicants yet developed for the control of many plant diseases. Moreover, as indicated in Examples 9, 10 and 11, toxicity to host plants is remarkably low in the compounds of the present invention. Although, as shown in my above-noted application, salts such as the acetate are exceptional and unique toxicants, which can be safely and effectively used for control of certain plant pathogens at controlled dosages, on certain plant varieties, in certain environal regimes, the utility of the salts of this invention allows use of a dodecylguanidine salt toxicant for the control of bacterial and fungal plant pathogens on a much wider range of hosts, at higher concentrations, and in most environments.

Various techniques can be employed for treating plants with the toxicants of this invention. For example, the fungicidal compound may be mixed with an inert carrier and applied either as a dust or as a spray. The compounds with which the present invention are concerned must be used in effective amounts. This will vary somewhat with the pathogen to be controlled, the host to be treated, and with other factors such as the environment in which treatment is conducted. In general, it will be found that an aqueous spray containing from about 0.25 to 2.5 pounds of active material per 100 gallons of water is satisfactory. With dust applications, a concentration of active material ranging from 5 to 15% is usually sufficient to obtain the maximum protection. These compounds can be used in these concentrations without injury to the plants, and they are relatively non-toxic to warm-blooded animals.

For purposes of use in spray applications, the fungicidal compound may be applied in an aqueous suspension. Usually this will be as a suspension of a more concentrated formulation which will include other ingredients in minor proportions. Among these are the use of organic, surface-active wetting or dispersing agents or inorganic dispersing agents such as kaolin, chalk and talc, spreading agents such as the fatty alcohol sulfonates; sticking agents such as gelatins, methylcellulose, spindle oil and soluble casein; and usually some antifoaming agent. In the preparation of dusting formulations the toxicant can be mixed with a suitable finely-divided carrier in any conventional manner. Operable carriers include clays, talc, wood flour, activated carbon, pumice, silica, silicates, chalk and the like.

In general, preparation of concentrates as wettable powders is perhaps the best method of preparation. Usually when such a concentrate is prepared, some 5–80 parts of toxicant is ground with the other ingredients. Some 20–100 parts of the inert carrier and a smaller amount of some wetting or dispersing agent will normally be used to provide products adapted to be dispersed in water or other aqueous spray compositions. The ingredients also may be separately compounded in concentrate form and mixed together upon dilution in the spray tank. Suitable organic wetting and dispersing surface active agents include sodium lauryl sulfate, isopropylnaphthalene sodium sulfonate (Aerosol OS), dioctyl sodium sulfosuccinate (Aerosol OT), alkylated aryl polyether alcohol (Triton X100), modified phthalic glycerol alkyd resin (Triton B1956), and the salts of alkyl and aryl sulfonic acids (Daxad 21). Usually some one to five parts will be used for the other proportions indicated. Some one to three parts of a good, commercially available, anti-foaming agent is also usually provided. If sticking agents are desirable they are also usually furnished in the concentrate.

Typical fungicidal compositions of this invention in which the parts are by weight include:

(a) A wettable powder containing 50 parts of active material, 31 parts of kaolin, 15 parts of talc, 2 parts of methylcellulose and 2 parts of an anionic dispersing agent such as the salts of alkyl and aryl sulfonic acids (Daxad 21).

(b) A wettable powder containing 70 parts of active material, 23 parts of kaolin, 2 parts of soluble casein, 3 parts of a modified phthalic glycerol alkyl resin (Triton B1956) and 2 parts of an antifoaming agent (Dow-Corning silicones).

(c) A wettable powder containing 90 parts of active material, 5 parts of Attapulgite clay, 3 parts of a modified phthalic glycerol alkyd resin and 2 parts of an ionic dispersing agent such as the salts of alkyl and aryl sulfonic acids.

(d) A dust containing 5 parts of active material, 93 parts of kaolin and 2 parts of spindle oil.

(e) A dust containing 8 parts of active material, 17 parts of Attapulgite clay and 75 parts of talc.

(f) A dust containing 15 parts of active material, 83 parts of chalk and 2 parts of methylcellulose.

I claim:

1. A compound of the formula

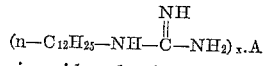

wherein A is boric acid and $x$ is a value from one to two, inclusively.

2. n-Dodecylguanidine borate.

References Cited in the file of this patent

UNITED STATES PATENTS

| | | |
|---|---|---|
| 2,213,474 | Puetzer | Sept. 3, 1940 |
| 2,409,883 | Migrdichian | Oct. 22, 1946 |
| 2,425,341 | Paden et al. | Aug. 12, 1947 |

FOREIGN PATENTS

| | | |
|---|---|---|
| 788,429 | France | July 29, 1935 |

OTHER REFERENCES

Nolan et al.: "Chem. Abstracts," volume 43, column 8086 (1949).

UNITED STATES PATENT OFFICE
CERTIFICATE OF CORRECTION

Patent No. 3,116,326                        December 31, 1963

Glentworth Lamb

It is hereby certified that error appears in the above numbered patent requiring correction and that the said Letters Patent should read as corrected below.

Column 2, line 33, for "refiltering" read -- refiltered --; column 3, line 72, for "varities" read -- varieties --; column 5, line 5, for "Ell. at Halst." read -- Ell. et Halst. --; same column 5, Table IV, heading to the second column, for "Concentration (p.p.m.)[1]" read -- Concentration (p.p.m.) --.

Signed and sealed this 30th day of June 1964.

(SEAL)
Attest:

ERNEST W. SWIDER                             EDWARD J. BRENNER
Attesting Officer                                Commissioner of Patents